United States Patent
Wang et al.

(10) Patent No.: US 10,496,613 B2
(45) Date of Patent: Dec. 3, 2019

(54) METHOD FOR PROCESSING INPUT/OUTPUT REQUEST, HOST, SERVER, AND VIRTUAL MACHINE

(71) Applicant: Huawei Technologies Co., Ltd., Shenzhen, Guangdong (CN)

(72) Inventors: Ting Wang, Hangzhou (CN); Yaqiong Li, Shenzhen (CN); Keping Chen, Hangzhou (CN); Weilong Chen, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1299 days.

(21) Appl. No.: 14/581,506

(22) Filed: Dec. 23, 2014

(65) Prior Publication Data
US 2015/0154227 A1 Jun. 4, 2015

Related U.S. Application Data

(63) Continuation of application No. PCT/CN2014/070915, filed on Jan. 20, 2014.

(30) Foreign Application Priority Data

Jul. 29, 2013 (CN) .......................... 2013 1 0322990

(51) Int. Cl.
    *G06F 16/188* (2019.01)
    *H04L 29/08* (2006.01)
    *G06F 3/06* (2006.01)
(52) U.S. Cl.
    CPC ............ *G06F 16/188* (2019.01); *G06F 3/067* (2013.01); *G06F 3/0608* (2013.01); *G06F 3/0643* (2013.01); *H04L 67/1097* (2013.01)

(58) Field of Classification Search
USPC ................................... 707/831; 710/1; 718/1
See application file for complete search history.

(56) References Cited

U.S. PATENT DOCUMENTS 8,676,764 B1 * 3/2014 Dutch ............... G06F 17/30082
                                                  707/654
8,856,074 B2 * 10/2014 Arrouye .................. G06F 16/11
                                                  707/625

(Continued)

FOREIGN PATENT DOCUMENTS

CN          102591702 A        7/2012
CN          102708060 A       10/2012

(Continued)

OTHER PUBLICATIONS

Mohammad Shamma, et al., "Capo: Recapitulating Storage for Virtual Desktops", Dec. 17, 2010, 15 pages.

(Continued)

*Primary Examiner* — Cheyne D Ly
(74) *Attorney, Agent, or Firm* — Leydig, Voit & Mayer, Ltd.

(57) ABSTRACT

A method for processing an I/O request and a computer system are provided. The method includes: receiving an I/O write request from a virtual machine; writing first data to be written as requested by the I/O write request into a local persistent storage area; determining a file type of a file to which the first data belongs; and writing the first data into a remote shared storage area if the file type of the file to which the first data belongs is a user file or a system file. Thus access traffic on the remote shared storage area can be reduced.

15 Claims, 8 Drawing Sheets

(56) References Cited

U.S. PATENT DOCUMENTS

| | | |
|---|---|---|
| 2007/0083522 A1* | 4/2007 | Nord ................ G06F 17/30067 |
| 2009/0049132 A1* | 2/2009 | Livne Gutovski ... G06Q 10/107 |
| | | 709/206 |
| 2009/0313702 A1* | 12/2009 | Mandava .......... G06F 17/30115 |
| | | 726/27 |
| 2010/0274784 A1 | 10/2010 | Acharya |
| 2011/0167239 A1* | 7/2011 | Horn ................ G06F 17/30129 |
| | | 711/171 |
| 2011/0265083 A1* | 10/2011 | Davis ................ G06F 12/0866 |
| | | 718/1 |
| 2011/0313982 A1* | 12/2011 | Kranendonk ....... G06F 9/45533 |
| | | 707/702 |
| 2013/0054927 A1* | 2/2013 | Raj ...................... G06F 3/0608 |
| | | 711/170 |
| 2013/0086579 A1 | 4/2013 | Venkat et al. |
| 2013/0097377 A1 | 4/2013 | Satoyama et al. |
| 2013/0174155 A1 | 7/2013 | Yang et al. |
| 2014/0089658 A1* | 3/2014 | Raghuram ............ H04L 9/0825 |
| | | 713/155 |
| 2014/0359229 A1* | 12/2014 | Cota-Robles ........... G06F 9/455 |
| | | 711/143 |

FOREIGN PATENT DOCUMENTS

| | | |
|---|---|---|
| CN | 103176845 A | 6/2013 |
| CN | 103389884 A | 11/2013 |
| EP | 2 372 519 A2 | 10/2011 |
| WO | WO 2005/111803 A2 | 11/2005 |
| WO | WO 2013/057751 A1 | 4/2013 |

OTHER PUBLICATIONS

Joshua Reich, et al., "VMTorrent: Scalable P2P Virtual Machine Streaming", CoNEXT '12, Dec. 10, 2012, p. 289-300.

\* cited by examiner

METHOD FOR PROCESSING INPUT/OUTPUT REQUEST, HOST, SERVER, AND VIRTUAL MACHINE

CROSS-REFERENCE TO RELATED APPLICATIONS

This application is a continuation of International Application No. PCT/CN2014/070915, filed on Jan. 20, 2014, which claims priority to Chinese Patent Application No. 201310322990.6, filed on Jul. 29, 2013, both of which are hereby incorporated by reference in their entireties.

TECHNICAL FIELD

The present invention relates to the field of information technologies, and in particular, to a method for processing an input/output (I/O) request, a host, a server, and a virtual machine.

BACKGROUND

That a user who works remotely can quickly access a usual desktop environment becomes a new requirement. Therefore, a desktop cloud solution is more and more widely applied. In a desktop cloud solution, a user can access a cross-platform application program or a whole client desktop by using a thin client, a tablet, or another device connected to a network, and can obtain experience the same as that of a conventional personal computer.

In a desktop cloud solution, a virtual desktop infrastructure (VDI) form is usually adopted. This VDI form uses a principle of "centralized computing and distributed display", and supports a client desktop workload, for example, an operating system, an application program, user data, and the like, to be hosted in a data center. A user can communicate with a virtual machine of the data center by using a client device that supports a remote desktop protocol, to access a virtual desktop environment. Because a virtual disk is under unified management of a remote shared storage of the data center, when the user initiates a write request to the virtual desktop environment, each virtual machine needs to update the virtual disk in the remote shared storage, where an I/O path is long. Therefore, processing of an I/O write request is delayed, and user experience is affected.

SUMMARY

Embodiments of the present invention provide a method for processing an I/O request, a host, a server and a virtual machine, which can reduce access traffic on a remote shared storage area, and can decrease delay of an I/O write request, and improve user experience.

According to a first aspect, a method for processing an input/output request is provided and includes: receiving an input/output I/O write request from a virtual machine; writing first data to be written as requested by the I/O write request into a local persistent storage area; determining a file type of a file to which the first data belongs, where the file type includes: a temporary file, a user file, and a system file; and writing the first data into a remote shared storage area if the file type of the file to which the first data belongs is the user file or the system file.

With reference to the first aspect, in a first possible implementation manner, the determining a file type of a file to which the first data belongs includes: reading image metadata from a memory virtual image, where the memory virtual image is used to store the image metadata, and the image metadata is used to describe data property information of a virtual disk and a type of a file system of the virtual disk; and determining the file type of the file to which the first data belongs according to the image metadata, a start sector corresponding to the I/O write request on the virtual disk, and a size of the first data.

With reference to the first aspect, in a second possible implementation manner, the determining a file type of a file to which the first data belongs includes: obtaining first file information carried by the I/O write request, where the first file information is determined by the virtual machine, and the first file information is used to indicate the file to which the first data belongs; and determining the file type of the file to which the first data belongs according to the first file information.

With reference to the first aspect or the first possible implementation manner or the second possible implementation manner of the first aspect, in a third possible implementation manner, the writing the first data into a remote shared storage area includes: aggregating the first data with second data stored in the local persistent storage area, to obtain aggregated data, where a file type of a file to which the second data belongs is the same with the file type of the file to which the first data belongs; and writing the aggregated data into the remote shared storage area.

With reference to the first aspect or any one implementation manner of the first possible implementation manner to the third possible implementation manner of the first aspect, in a fourth possible implementation manner, after the writing the first data into a remote shared storage area, the method further includes: writing the first data into a local cache area if the file to which the first data belongs is the user file or the system file, and a use frequency of the first data is higher than or equal to a first threshold.

With reference to the first aspect or any one implementation manner of the first possible implementation manner to the fourth possible implementation manner of the first aspect, in a fifth possible implementation manner, the method further includes: receiving an I/O read request from the virtual machine; successively searching a local cache area, the local persistent storage area, and the remote shared storage area for third data to be read as requested by the I/O read request until the third data is found; and sending the found third data to the virtual machine.

With reference to the fifth possible implementation manner of the first aspect, in a sixth possible implementation manner, after the sending the found third data to the virtual machine, the method further includes: determining a file type of a file to which the third data belongs; and writing the third data into the local cache area when the file type of the file to which the third data belongs is the user file or the system file, and a use frequency of the third data is higher than or equal to a second threshold.

With reference to the sixth possible implementation manner of the first aspect, in a seventh possible implementation manner, the determining a file type of a file to which the third data belongs includes: reading image metadata from a memory virtual image, where the memory virtual image is used to store the image metadata, and the image metadata is used to describe data property information of a virtual disk and a type of a file system of the virtual disk; and determining the file type of the file to which the third data belongs according to the image metadata, a start sector corresponding to the I/O read request on the virtual disk, and a size of the third data.

With reference to the sixth possible implementation manner of the first aspect, in an eighth implementation manner, the determining a file type of a file to which the third data belongs includes: obtaining the second file information carried by the I/O read request, where the second file information is determined by the virtual machine, and the second file information is used to indicate the file to which the third data belongs; and determining the file type of the file to which the third data belongs according to the second file information.

With reference to the first possible implementation manner or the seventh possible implementation manner of the first aspect, in a ninth possible implementation manner, before the reading image metadata from a memory virtual image, the method further includes: generating the memory virtual image.

According to a second aspect, a method for processing an input/output request is provided and includes: determining first file information corresponding to an input/output I/O write request, where the first file information is used to indicate a file to which first data to be written as requested by the I/O write request belongs; and sending the I/O write request to a host, where the I/O write request carries the first file information, so that the host determines a file type of the file to which the first data belongs according to the first file information after writing the first data to be written as requested by the I/O write request into a local persistent storage area, and writes the first data into a remote shared storage area when it is determined that the file type of the file to which the first data belongs is a user file or a system file.

With reference to the second aspect, in a first possible implementation manner, the method further includes: determining second file information corresponding to an I/O read request, where the second file information is used to indicate a file to which third data to be read as requested by the I/O read request belongs; sending the I/O read request to the host, where the I/O read request carries the second file information, so that the host successively searches a local cache area, the local persistent storage area, and the remote shared storage area for the third data to be read as requested by the I/O read request until the third data is found; and receiving the third data sent by the host.

According to a third aspect, a host is provided and includes: a receiving unit, configured to receive an input/output I/O write request from a virtual machine; a storage unit, configured to write first data to be written as requested by the I/O write request into a local persistent storage area; and a determining unit, configured to determine a file type of a file to which the first data belongs, where the first data is written by the storage unit into the local persistent storage area, and the file type includes: a temporary file, a user file, and a system file; where the storage unit is further configured to write the first data into a remote shared storage area when the file type of the file to which the first data belongs is the user file or the system file.

With reference to the third aspect, in a first possible implementation manner, the determining unit is specifically configured to read image metadata from a memory virtual image, where the memory virtual image is used to store the image metadata, and the image metadata is used to describe data property information of a virtual disk and a type of a file system of the virtual disk; and determine the file type of the file to which the first data belongs according to the image metadata, a start sector corresponding to the I/O write request on the virtual disk, and a size of the first data.

With reference to the third aspect, in a second possible implementation manner, the determining unit is specifically configured to obtain the first file information carried by the I/O write request, where the first file information is determined by the virtual machine, and the first file information is used to indicate the file to which the first data belongs; and determine the file type of the file to which the first data belongs according to the first file information.

With reference to the third aspect or the first possible implementation manner or the second possible implementation manner of the third aspect, in a third possible implementation manner, the storage unit is specifically configured to aggregate the first data with second data in the local persistent storage area, to obtain aggregated data, where a file type of a file to which the second data belongs is the same with the file type of the file to which the first data belongs; and write the aggregated data into the remote shared storage area.

With reference to the third aspect or any one implementation manner of the first possible implementation manner to the third possible implementation manner of the third aspect, in a fourth possible implementation manner, the storage unit is further configured to, after the first data is written into the remote shared storage area, write the first data into a local cache area if the file to which the first data belongs is the user file or the system file, and a use frequency of the first data is higher than or equal to a preset first threshold.

With reference to the third aspect or any one implementation manner of the first possible implementation manner to the fourth possible implementation manner of the third aspect, in a fifth possible implementation manner, the host further includes: the receiving unit, further configured to receive an I/O read request from the virtual machine; a searching unit, configured to successively search the local cache area, the local persistent storage area, and the remote shared storage area for third data to be read as requested by the I/O read request until the third data is found; and a sending unit, configured to send the found third data to the virtual machine.

With reference to the fifth possible implementation manner of the third aspect, in a sixth possible implementation manner, the determining unit is further configured to determine a file type of a file to which the third data belongs after the found third data is sent to the virtual machine; and the storage unit is further configured to write the third data into the local cache area when the file type of the file to which the third data belongs is the user file or the system file, and a use frequency of the third data is higher than or equal to a second threshold.

With reference to the sixth possible implementation manner of the third aspect, in a seventh possible implementation manner, the determining unit is specifically configured to read image metadata from a memory virtual image, where the memory virtual image is used to store the image metadata, and the image metadata is used to describe data property information of a virtual disk and a type of a file system of the virtual disk; and determine the file type of the file to which the third data belongs according to the image metadata, a start sector corresponding to the I/O read request on the virtual disk, and a size of the third data.

With reference to the sixth possible implementation manner of the third aspect, in an eighth implementation manner, the determining unit is specifically configured to obtain the second file information carried by the I/O read request, where the second file information is determined by the virtual machine, and the second file information is used to indicate the file to which the third data belongs; and determine the file type of the file to which the third data belongs according to the second file information.

With reference to the first possible implementation manner or the seventh possible implementation manner of the third aspect, in a ninth possible implementation manner, the host further includes: a generating unit, configured to generate the memory virtual image before the image metadata is read from the memory virtual image.

According to a fourth aspect, a server is provided and includes: a hardware layer, a host running on the hardware layer, and a virtual machine VM running on the Host, where the hardware layer includes an input/output I/O device and a local persistent storage area; the host is configured to receive an I/O write request from the virtual machine, where the I/O write request is sent to the virtual machine by a client by using the I/O device; write first data to be written as requested by the I/O write request into the local persistent storage area, and determine a file type of a file to which the first data belongs, where the file type includes: a temporary file, a user file, and a system file; and write the first data into a remote shared storage area connected to the server if the file type of the file to which the first data belongs is the user file or the system file.

With reference to the fourth aspect, in a first possible implementation manner, the host is specifically configured to read image metadata from a memory virtual image, where the memory virtual image is used to store the image metadata, and the image metadata is used to describe data property information of a virtual disk of the virtual machine and a type of a file system of the virtual disk of the virtual machine; and determine the file type of the file to which the first data belongs according to the image metadata, a start sector corresponding to the I/O write request on the virtual disk, and a size of the first data.

With reference to the fourth aspect or the first possible implementation manner of the fourth aspect, in a second possible implementation manner, the host is specifically configured to aggregate the first data with second data in the local persistent storage area, to obtain aggregated data, where a file type of a file to which the second data belongs is the same with the file type of the file to which the first data belongs; and write the aggregated data into the remote shared storage area.

According to a fifth aspect, a virtual machine is provided and includes: a determining unit, configured to determine first file information corresponding to an input/output I/O write request, where the first file information is used to indicate a file to which first data to be written as requested by the I/O write request belongs; a sending unit, configured to send the I/O write request to a host, where the I/O write request carries the first file information, so that the host determines a file type of the file to which the first data belongs according to the first file information after writing the first data to be written as requested by the I/O write request into a local persistent storage area, and writes the first data into a remote shared storage area when it is determined that the file type of the file to which the first data belongs is a user file or a system file.

In the foregoing technical solutions provided by the embodiments of the present invention, a file type of a file to which first data belongs is determined, where the first data is stored in a local persistent storage area; and the first data stored in the local persistent storage area, rather than data of all types, is written into a remote shared storage area in a case that the file to which the first data belongs is a user file or a system file. Therefore, access traffic on the remote shared storage area can be reduced, thereby decreasing delay of an I/O write request and improving user experience.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings according to these accompanying drawings without creative efforts.

DETAILED DESCRIPTION

The following clearly describes the technical solutions in the embodiments of the present invention with reference to the accompanying drawings in the embodiments of the present invention. Apparently, the embodiments to be described are a part rather than all of the embodiments of the present invention. All other embodiments obtained by a person of ordinary skill in the art based on the embodiments of the present invention without creative efforts shall fall within the protection scope of the present invention.

In order to make the embodiments of the present invention easily understood, several elements in the descriptions of the embodiments of the present invention are introduced firstly:

Virtual machine (VM): one or more virtual computers (that is/are VM/VMs) can be simulated on a physical computer or a server by using virtual machine software, and these virtual computers work like real computers. An operating system and an application program may be installed on the virtual machine. The virtual machine may also access network resources. For an application program running on the virtual machine, the virtual machine is like working in a real computer.

Hardware layer: a hardware platform on which a virtualized environment runs. The hardware layer may include many types of hardware. For example, a hardware layer of a certain server may include a CPU and a memory, and may further include a network adapter, a storage, a high-speed/low-speed input/output (I/O) device, and another device having a specific processing function, such as an input/output memory management unit (IOMMU), where the IOMMU may be used for conversion between a virtual machine physical address and a host physical address.

Host: as a management layer, used to implement management and allocation of hardware resources; present a virtual hardware platform for a virtual machine; and implement scheduling and isolation of the virtual machine. More specifically, the host in all the embodiments of the present invention refers to a system component having a virtual disk service function in a server. For example, the host may be a privileged virtual machine, or may also be a virtual machine monitor (VMM). In addition, sometimes a VMM cooperates with a privileged virtual machine, and the VMM and the privileged virtual machine are combined to form a host. In different virtualized architectures, the host may be named differently, which is not particularly limited in the embodiments of the present invention. The virtual hardware platform provides various hardware resources for each virtual machine running thereon, for example, provides a virtual CPU, a memory, a virtual disk, a virtual network adapter, and the like. The virtual disk may correspond to a file or a logic block device of the host.

Figure 1:
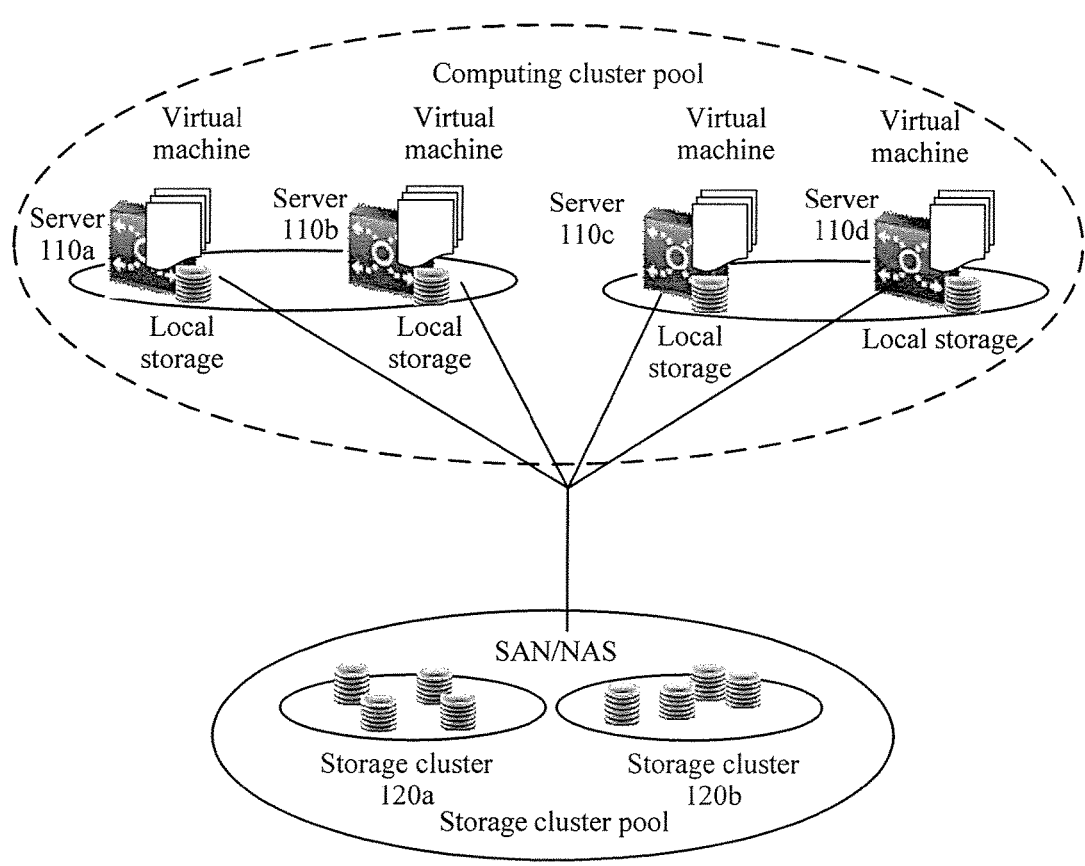
FIG. 1 is a schematic diagram of a scenario where an embodiment of the present invention can be applied.

FIG. 1 is a schematic diagram of a scenario where an embodiment of the present invention can be applied.

As shown in FIG. 1, the scenario may include a computing cluster pool and a storage cluster pool. The computing cluster pool may include a group of servers. As shown in FIG. 1, the computing cluster pool may include servers 110a, 110b, 110c and 110d. The servers 110a to 110d may be connected by using loosely-integrated computer software or hardware or both to perform collaborative operations. One or more virtual machines may run on each server, and the server is further deployed with a host for implementing a virtual disk service function. In addition, each server may have a local storage, and the local storage may include a local cache and a local persistent storage. Each server can perform data read and write operations on its own local storage.

The storage cluster pool may include a plurality of storage clusters, such as storage clusters 120a and 120b shown in FIG. 1. Each storage cluster may include a plurality of storage devices, and storage space of the plurality of storage devices may form a shared storage pool, which can provide a unified access interface and a management platform for the servers in the computing cluster pool. Therefore, relative to the local storage of the server, the storage cluster pool may be referred to as a remote shared storage.

As shown in FIG. 1, all the servers 110a to 110d in the computing cluster pool can access the storage devices in the storage cluster pool to perform data read and write operations. For example, the servers 110a to 110d may be connected to the storage cluster pool by using a standard network topological structure. In this case, the storage cluster pool may be referred to as a network attached storage (NAS). Alternatively, the servers 110a to 110d may be connected to the storage cluster pool by using a Fiber Channel technology. In this case, the storage cluster pool may be referred to as a storage area network (SAN).

Therefore, in the embodiments of the present invention, a storage manner may include manners such as a local persistent storage and a remote shared storage. A local persistent storage area may implement the local persistent storage manner. The local persistent storage manner has features such as a fast access rate and data non-volatility. The local persistent storage area may include a solid storage disk (SDD) or a hard disk driver (HDD), or the like. A remote shared storage area may implement the remote shared storage manner. The remote shared storage manner has features such as a slow access rate, data non-volatility, and multi-server sharing. The remote shared storage area may include an NAS or an Internet Protocol storage area network (IP-SAN).

Figure 2:
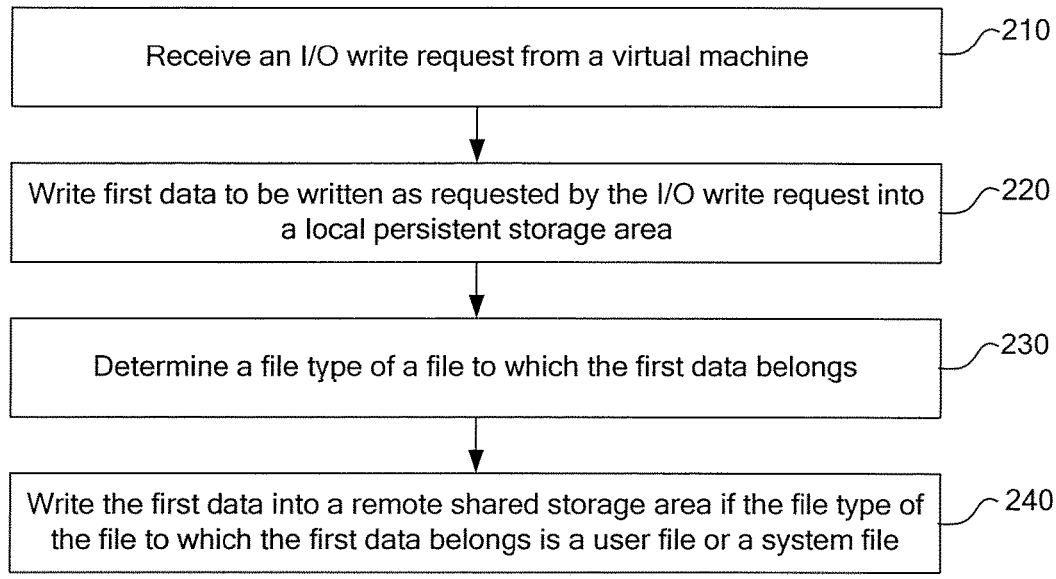
FIG. 2 is a flowchart of a method for processing an input/output request according to an embodiment of the present invention.

FIG. 2 is a schematic flowchart of a method for processing an I/O request according to an embodiment of the present invention. The method of FIG. 2 is executed by a server, for example, may be executed by one of the servers 110a to 110d shown in FIG. 1, or more precisely, may be executed by a host or a virtual disk service component of the server.

210: Receive an I/O write request from a virtual machine.

220: Write first data to be written as requested by the I/O write request into a local persistent storage area.

For example, when a client device initiates a write request to the virtual machine for accessing a virtual desktop, the virtual machine may send the I/O write request to a server (or more specifically, a virtual disk service system component of the server) based on the write request of the client device. The server may write the first data into the local persistent storage area after receiving the I/O write request of the virtual machine.

230: Determine a file type of a file to which the first data belongs, where the first data is stored in the local persistent storage area, and the file type includes: a temporary file, a user file, and a system file.

For example, for a new technology file system (NTFS), the file to which the first data belongs may be $Boot, $MFT, or \xxx\aaa.txt. For example, the $Boot and $MFT files may be system files. The \xxx\aaa.txt file may be a user file.

240: Write the first data into a remote shared storage area if the file type of the file to which the first data belongs is the user file or the system file.

It can be known from the above that, in the prior art, data of all types needs to be written into the remote shared storage area. In the embodiment of the present invention, the first data is written into the local persistent storage area, and then the first data of the local persistent storage is written into the remote shared storage area in a case that the file type of the file to which the first data belongs is the user file or the system file. If the file to which the first data belongs is the temporary file, the first data may be merely stored locally, and does not need to be written into the remote shared storage area. Therefore, the embodiment of the present invention can reduce access traffic on the remote shared storage area, thereby decreasing delay of the I/O write request and improving user experience.

In the embodiment of the present invention, a file type of a file to which first data belongs is determined, where the first data is stored in a local persistent storage area; and the first data stored in the local persistent storage area, rather than data of all types, is written into a remote shared storage area in a case that the file to which the first data belongs is a user file or a system file. Therefore, access traffic on the remote shared storage area can be reduced, thereby decreasing delay of an I/O write request and improving user experience.

Optionally, as an implement manner of the embodiment, before step 230, a memory virtual image may be generated, where the memory virtual image is used to store image metadata, and the image metadata is used to describe data property information of a virtual disk and a type of a file system of the virtual disk.

The memory virtual image may include a metadata area, and the metadata area is used to store the image metadata. The image metadata may be used to describe the data property information of the virtual disk and the type of the file system of the virtual disk.

The remote shared storage area may include a data area and the foregoing metadata area, and the data area and the metadata area on the remote shared storage area may be referred to as the virtual disk. A carrier of data of the virtual disk may be a common file, a block device, a virtual machine image file of another format, or the like. The data property information of the virtual disk may be used to indicate a property of data of the virtual disk. The type of the file system of the virtual disk may be types of various file systems in the prior art, such as an NTFS.

Figure 3:
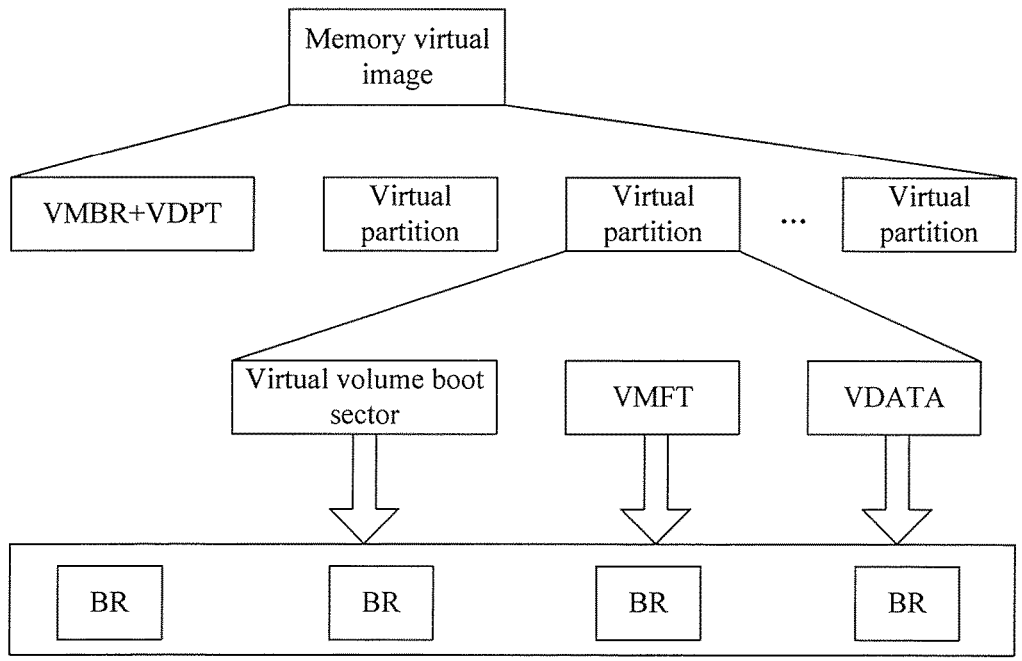
FIG. 3 is a schematic block diagram of a structure of a memory virtual image according to an embodiment of the present invention.

That the file system is the NTFS is used as an example in the following to describe a structure of the memory virtual image. FIG. 3 is a schematic block diagram of a structure of a memory virtual image according to an embodiment of the present invention.

As shown in FIG. 3, when the file system is the NTFS, a memory virtual image may include a plurality of virtual partitions, a virtual master boot record (VMBR) and a virtual disk partition table (VDPT). Each virtual partition may include a virtual volume boot sector, a virtual master file table (VMFT), virtual data (VDATA), and other parts. Each part may be formed by one or more block regions (BR). Each BR may represent a real storage path of a certain data segment in the memory virtual image and related features of the file system. The image metadata may be stored in each BR.

Optionally, as an implementation manner of the embodiment, in step 230, the image metadata may be read from the memory virtual image, and the file type of the file to which the first data belongs may be determined according to the image metadata, a start sector corresponding to the I/O write request on the virtual disk, and a size of the first data.

Specifically, the server may resolve a layout of the virtual disk by reading the image metadata from the memory virtual image. Then, the server determines the type of the first data in the file system according to the start sector corresponding to the I/O write request and the size of the first data. Herein, the size of the first data refers to storage space that the first data needs to occupy, and can specifically be measured in a common unit of byte or bit. For example, for the virtual disk with the type of the file system as the NTFS, the type of the first data may be a Boot Sector, file metadata or file data. The file to which the first data belongs may be determined according to the type of the first data. For example, for the virtual disk with the type of the file system as the NTFS, the file to which the first data belongs may be $Boot, $MFT, or \xxx\aaa.txt, and so the file type of the file to which the first data belongs is determined.

Specifically, in a Xen architecture, a plurality of virtual domains may run on the server, and the virtual domains may include a privileged domain and an unprivileged domain. The privileged domain usually refers to a first virtual domain running on the server, and can manage and control other domains on the server. In the embodiment of the present invention, the privileged domain is referred to as a host, and the unprivileged domain is referred to as a virtual machine.

Figure 4A:
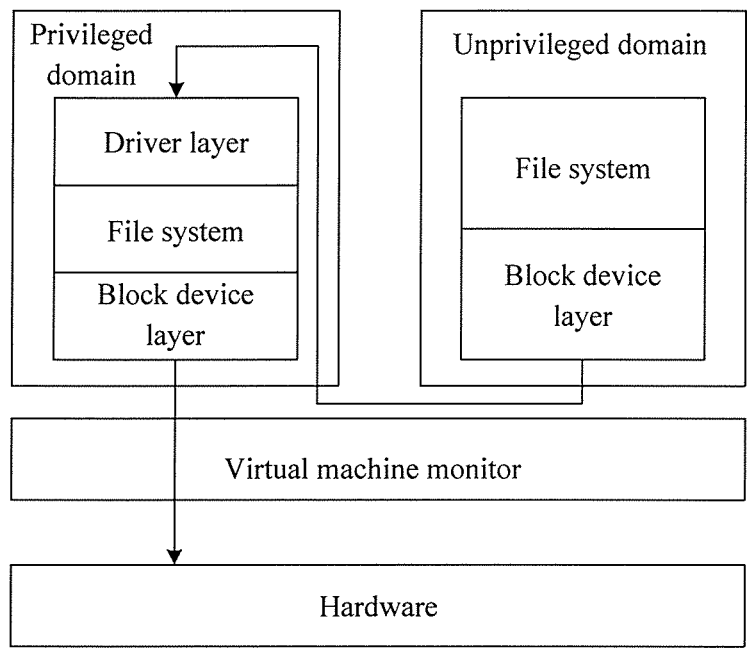
FIG. 4a is a schematic structural diagram of a server according to an embodiment of the present invention.

For example, a driver layer may be added to a file system of the privileged domain of the server, and the driver layer implements the foregoing process of determining first file information. FIG. 4a is a schematic structural diagram of a server according to an embodiment of the present invention. As shown in FIG. 4a, a driver layer is added to a file system of the privileged domain, and the driver layer may implement the foregoing process of determining the first file information.

Optionally, as an implementation manner of the embodiment, in step 230, first file information carried by the I/O write request may be obtained, where the first file information is used to indicate the file to which the first data belongs. Then, the file type of the file to which the first data belongs may be determined according to the first file information.

Figure 4B:
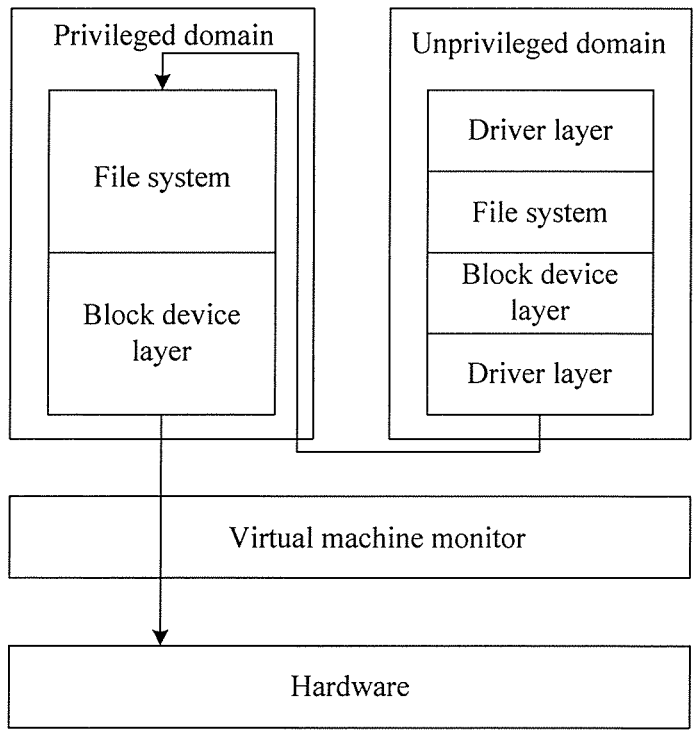
FIG. 4b is a schematic structural diagram of a server according to another embodiment of the present invention.

Specifically, the virtual machine may associate file information and an I/O request. For example, a driver layer may be added separately to a file system and a block device layer of the virtual machine to implement association between the file information and the I/O request. FIG. 4b is a schematic structural diagram of a server according to another embodiment of the present invention. As shown in FIG. 4b, a driver layer is added on a file system of the unprivileged domain (namely, the virtual machine), and a driver layer is added under a block device layer of the unprivileged domain. In this way, the unprivileged domain, namely, the virtual machine, may implement the process of determining the first file information by using the two driver layers, and send the first file information to the privileged domain. The first file information may be used to indicate the file to which the first data belongs. The privileged domain of the server may obtain the first file information directly from the I/O write request, so as to determine the file type of the file to which the first data belongs.

Optionally, as an implementation manner of the embodiment, the first data stored in the local persistent storage area may be aggregated with second data in the local persistent storage area, to obtain aggregated data, where a file type of a file to which the second data belongs is also the user file or the system file, and then the aggregated data is written into the remote shared storage area.

The host may aggregate the first data in the local persistent storage area with other data, where a file to which the other data belongs is the user file or the system file. That is, the host may aggregate the first data in the local persistent storage area with the second data. The aggregation may be aggregation for the foregoing I/O write request corresponding to the first data and an I/O write request corresponding to the second data. For example, the second data and the first data may be data with continuous addresses, the aggregated data is obtained after the aggregation, and then the aggregated data may be written into the remote shared storage area by using one I/O write request. The operation may also be referred to as I/O aggregation. The server may periodically or aperiodically execute the operation.

In the embodiment of the present invention, the first data stored in the local persistent storage area may be aggregated with multiple copies of second data in the local persistent storage area. For example, in the local persistent storage area, a start address of the first data is 5, and a size is 10, a start address of the first copy of second data is 20, and a size is 5, and a start address of the second copy of second data is 15, and a size is 10. The first data may be aggregated with the two copies of second data to obtain aggregated data, and a start address of the aggregated data is 5, and a size is 25. In this way, the aggregated data may be written into the remote shared storage area by using one I/O write request.

In the embodiment of the present invention, first data in a local persistent storage area is aggregated with second data which belongs to a user file or a system file, and then the aggregated data is written into a remote shared storage area, thereby further reducing access traffic on the remote shared storage area and improving user experience.

Optionally, as an implementation manner of the embodiment, after step 230, the first data may be written into a local cache area if the file type of the file to which the first data belongs is the user file or the system file, and a use frequency of the first data is higher than or equal to a first threshold.

The foregoing storage manner may further include a local caching manner. The local caching manner has features such as a fast access rate and data volatility. The local cache area may be used to implement the local caching manner. The local cache area may use a storage medium such as a memory.

If the first data belongs to the user file or the system file, and is frequently-used data, the first data may also be written into the local cache area, thereby improving a data access rate.

The foregoing first threshold may be determined by the host according to a usage condition of the first data and usage conditions of other data. Therefore, the first threshold is variable. For example, the server discovers after a period of statistics collection that, a use frequency of the first data is more than 40% and use frequencies of other data are all less than 40%, and then the first threshold may be set to be 40%.

Optionally, as an implementation manner of the embodiment, an I/O read request may be received from the virtual machine, and the local cache area, the local persistent storage area, and the remote shared storage area are successively searched for third data to be read as requested by the I/O read request until the third data is found, and the found third data is sent to the virtual machine.

Specifically, the host may firstly search the local cache area for the third data according to the I/O read request of the virtual machine. If the third data is found in the local cache area, the third data is returned to the virtual machine, and if the third data is not found in the local cache area, the local persistent storage area is searched for the third data. If the third data is found in the local persistent storage area, the third data is returned to the virtual machine, and if the third data is not found in the local persistent storage area, the remote shared storage area is searched for the third data, and the found third data is sent to the virtual machine.

Therefore, in the embodiment of the present invention, because a local cache area, a local persistent storage area, and a remote shared storage area are successively searched for third data to be read as requested by an I/O read request, and if the third data is found locally, access traffic on the remote shared storage can be reduced, thereby decreasing delay of the I/O read request and improving user experience.

Optionally, as an implementation manner of the embodiment, a file type of a file to which the third data belongs may be determined after the found third data is sent to the virtual machine. When the file type of the file to which the third data belongs is the user file or the system file, and a use frequency of the third data is higher than or equal to a second threshold, the third data may be written into the local cache area.

Specifically, in a case that the third data is found in the local persistent storage area or the remote shared storage area, if the third data belongs to the user file or the system file and is frequently-used data, the third data may be stored in the local cache area, thereby improving a data access rate.

The second threshold may also be determined by the host according to a usage condition of the third data and usage conditions of other data. The determining manner is similar to that of the first threshold.

Optionally, as an implementation manner of the embodiment, the image metadata may be read from the memory virtual image, and the file type of the file to which the third data belongs may be determined according to the image metadata, a start sector corresponding to the I/O read request on the virtual disk, and a size of the third data.

The process is similar to the process of determining the file type of the file to which the first data belongs, and details are not described again.

Optionally, as an implementation manner of the embodiment, second file information carried by the I/O read request may be obtained, where the second file information is determined by the virtual machine according to a mapping relationship between file information and the I/O read request.

Figure 5:
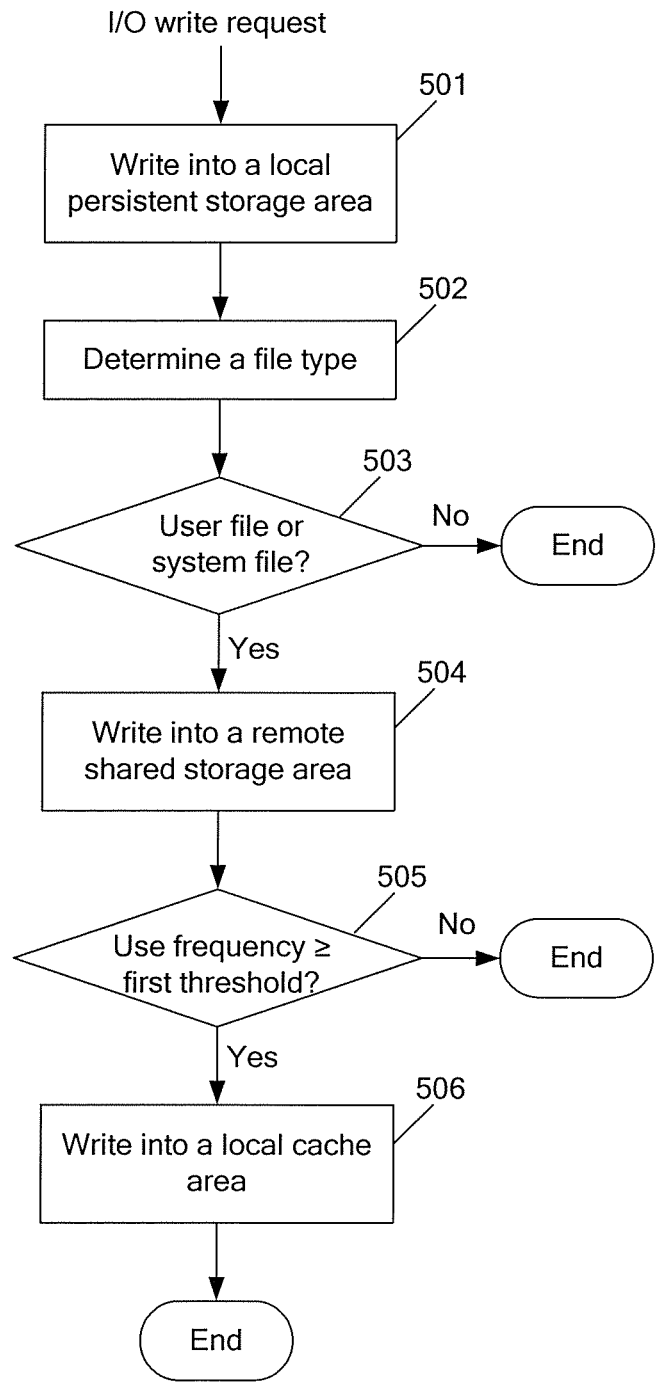
FIG. 5 is a flowchart of a method for processing an input/output request according to an embodiment of the present invention.

FIG. 5 is a schematic flowchart of a process of a method for processing an I/O write request according to an embodiment of the present invention. The method of FIG. 5 is executed by a server, for example, may be executed by one of the servers 110a to 110d shown in FIG. 1, or more precisely, may be executed by a host or a virtual disk service component of the server.

501: Write first data to be written as requested by an I/O write request into a local persistent storage area.

502: Determine a file type of a file to which the first data belongs, where the first data is stored in the local persistent storage area, and the file type may include: a temporary file, a user file, and a system file.

503: Determine whether the file type of the file to which the first data belongs is the user file or the system file.

If the file type of the file to which the first data belongs is the user file or the system file, turn to step 504.

If the file type of the file to which the first data belongs is the temporary file, the process ends.

504: Write the first data in the local persistent storage area into a remote shared storage area if the file type of the file to which the first data belongs is the user file or the system file.

After step 503, step 504 may be executed according to an actual condition. For example, step 504 may be executed immediately, or step 504 may be executed after a period. For example, the server may write the first data in the local persistent storage area into the remote shared storage area when the system is idle, or at regular intervals, or when a data volume in the local persistent storage area exceeds a certain threshold.

Optionally, the first data in the local persistent storage area may be aggregated with second data in the local persistent storage area, to obtain aggregated data, and then the aggregated data is written into the remote shared storage area. A file type of a file to which the second data belongs is also the user file or the system file.

505: If the file type of the file to which the first data belongs is the user file or the system file, determine whether a use frequency of the first data is higher than or equal to a first threshold.

If the use frequency of the first data is higher than or equal to the first threshold, turn to step 506.

If the use frequency of the first data is lower than the first threshold, the process ends.

506: Write the first data in the local persistent storage area into a local cache area if the use frequency of the first data is higher than or equal to the first threshold.

After the first data in the local persistent storage area is written into the local cache area, the process ends.

In the embodiment of the present invention, a file type of a file to which first data belongs is determined, where the first data is stored in a local persistent storage area; and the first data stored in the local persistent storage area, rather than data of all types, is written into a remote shared storage area in a case that the file to which the first data belongs is a user file or a system file. Therefore, access traffic on the remote shared storage area can be reduced, thereby decreasing delay of an I/O write request and improving user experience.

Figure 6:
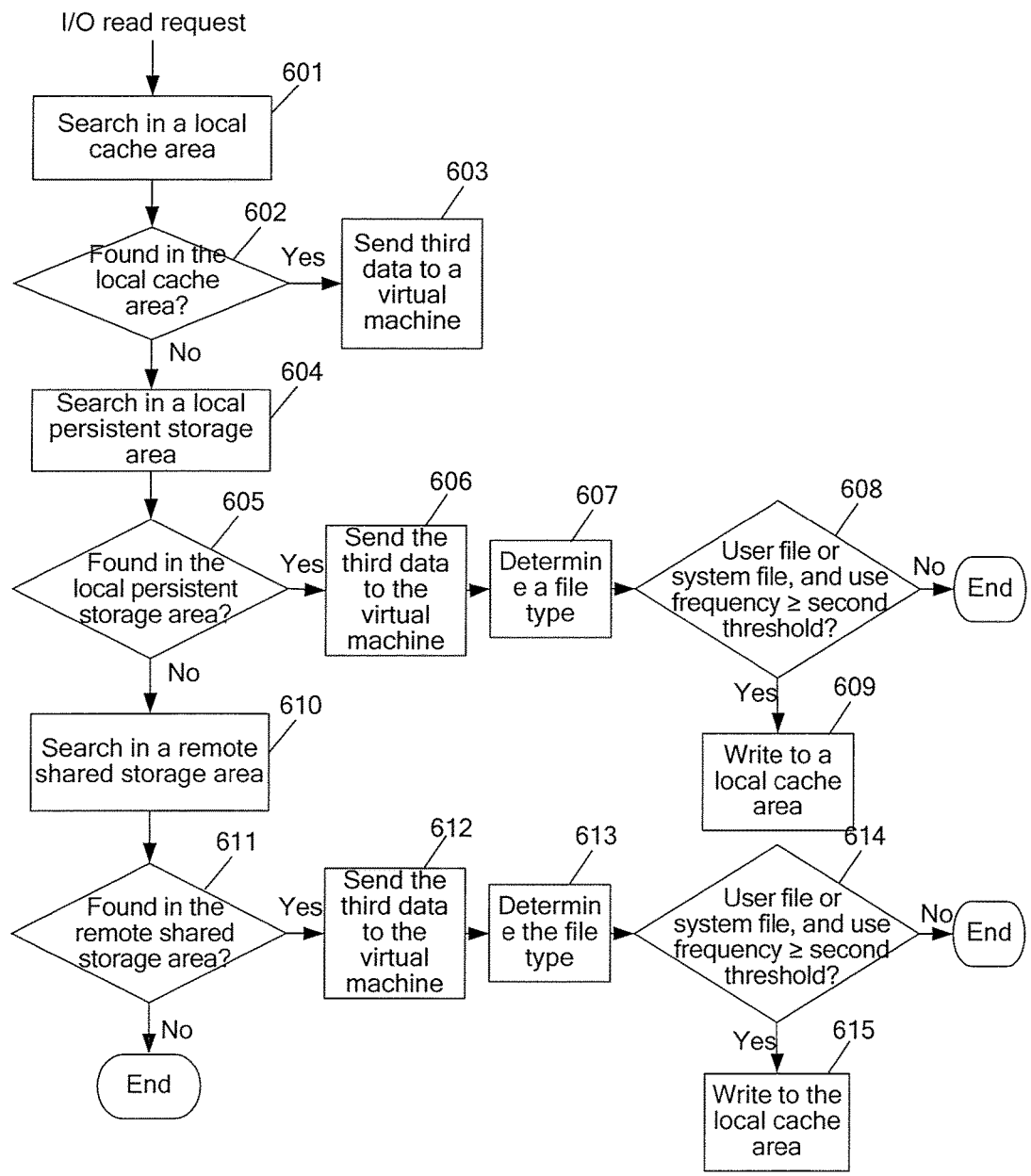
FIG. 6 is a flowchart of a method for processing an input/output request according to another embodiment of the present invention.

FIG. 6 is a schematic flowchart of a process of a method for processing an I/O read request according to another embodiment of the present invention. The method of FIG. 6 is executed by a server, for example, may be executed by one of the servers 110a to 110d shown in FIG. 1, or more precisely, may be executed by a host or a virtual disk service component of the server.

601: Search a local cache area for third data to be read as requested by an I/O read request according to the I/O read request received from a virtual machine.

602: Determine whether the third data is found in the local cache area.

603: If the third data is found in the local cache area, send the third data to the virtual machine.

604: If the third data is not found in the local cache area, search a local persistent storage area for the third data.

605: Determine whether the third data is found in the local persistent storage area.

606: If the third data is found in the local persistent storage area, send the third data to the virtual machine.

607: Determine a file type of a file to which the third data belongs.

For example, the file type of the file to which the third data belongs may be a temporary file, a user file or a system file.

608: Determine whether the file type of the file to which the third data belongs is the user file or the system file, and whether a use frequency of the third data is higher than or equal to a second threshold.

If the file type of the file to which the third data belongs is not the user file or the system file, or the use frequency of the third data is lower than the second threshold, the process ends.

609: Write the third data into the local cache area if the file type of the file to which the third data belongs is the user file or the system file, and the use frequency of the third data is higher than or equal to the second threshold.

610: If the third data is not found in the local persistent storage area, search a remote shared storage area for the third data.

611: Determine whether the third data is found in the remote shared storage area.

612: If the third data is found in the remote shared storage area, send the third data to the virtual machine.

Steps 613 to 615 are similar to steps 607 to 609, and to avoid repetition, details are not described again.

In the embodiment of the present invention, because a local cache area, a local persistent storage area, and a remote shared storage area are successively searched for third data to be read as requested by an I/O read request, and if the third data is found locally, access traffic on the remote shared storage can be reduced, thereby decreasing delay of the I/O read request and improving user experience.

Figure 7:
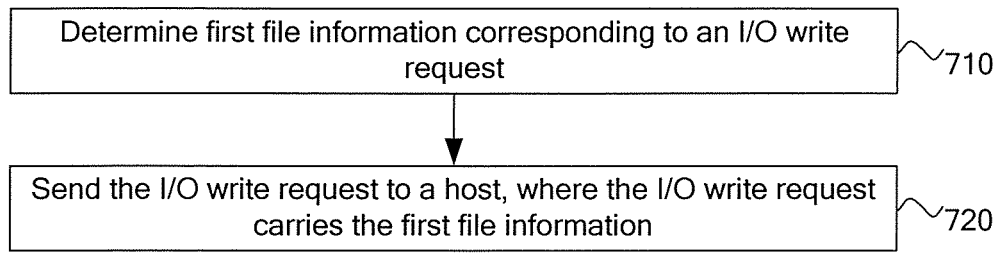
FIG. 7 is a flowchart of a method for processing an input/output request according to another embodiment of the present invention.

FIG. 7 is a schematic flowchart of a method for processing an I/O request according to another embodiment of the present invention. The method of FIG. 7 is executed by a virtual machine, for example, may be executed by a virtual machine running on one of the servers 110a to 110d shown in FIG. 1.

710: Determine first file information corresponding to an input/output I/O write request, where the first file information is used to indicate a file to which first data to be written as requested by the I/O write request belongs.

For example, as shown in FIG. 4b, a driver layer is added on a file system of the virtual machine, and a driver layer is added under a block device layer of the virtual machine. In this way, the virtual machine may implement the process of determining the first file information by using two driver layers.

720: Send the I/O write request to a host, where the I/O write request carries the first file information, so that the host determines a file type of the file to which the first data belongs according to the first file information after writing the first data to be written as requested by the I/O write request into a local persistent storage area, and writes the first data into a remote shared storage area in a case that the file type of the file to which the first data belongs is a user file or a system file.

The virtual machine may send the I/O write request to the host, so that the host processes the I/O write request. For example, the host may write the first data to be written as requested by the I/O write request into the local persistent storage area. In addition, the host may determine the file type of the file to which the first data belongs according to the first file information carried by the I/O write request. In this way, in a case that the file to which the first data belongs is the user file or the system file, the first data stored in the local persistent storage area is written into the remote shared storage area.

In the embodiment of the present invention, first file information for indicating a file of first data to be written as requested by an I/O write request is determined, and the I/O write request carrying the first file information is sent to a host, so that the host writes the first data stored in a local persistent storage area into a remote shared storage area in a case that the file to which the first data belongs is a user file or a system file, rather than writing data of all types into the remote shared storage area. Therefore, access traffic on the remote shared storage area can be reduced, thereby decreasing delay of an I/O write request and improving user experience.

Optionally, as an implement manner of the embodiment, the virtual machine may determine second file information corresponding to an I/O read request, where the second file information is used to indicate a file to which third data to be read as requested by the I/O read request belongs, and may send the I/O read request to the host, where the I/O read request carries the second file information.

Similar to the process of determining the first file information, the virtual machine may implement a process of determining the second file information by using the driver layer added on the file system and the driver layer added under the block device layer. The host may determine a file type of the file to which the third data belongs according to the second file information. In a case that the third data is found in the local persistent storage area or the remote shared storage area, if the third data belongs to the user file or the system file and is frequently-used data, the third data may be stored in the local cache area, thereby improving a data access rate.

Figure 8:
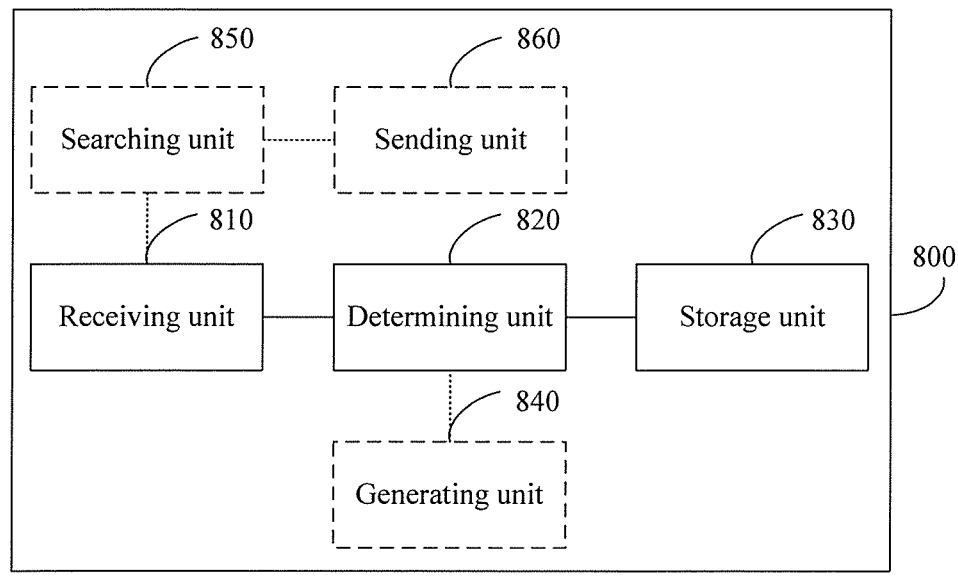
FIG. 8 is a schematic block diagram of a server according to an embodiment of the present invention.

FIG. 8 is a schematic block diagram of a host according to an embodiment of the present invention. For example, a host 800 in FIG. 8 may be a privileged virtual machine or a virtual disk service component of the server 110a, 110b, 110c or 110d shown in FIG. 1. The host 800 includes a receiving unit 810, a determining unit 820, and a storage unit 830.

The receiving unit 810 receives an I/O write request from a virtual machine. The storage unit 830 writes first data to be written as requested by the I/O write request into a local persistent storage area of the host 800. The determining unit 820 determines a file type of a file to which the first data belongs, where the first data is stored in the local persistent storage area, and the file type includes: a temporary file, a user file, and a system file. The storage unit 830 writes the first data into a remote shared storage area in a case that the file type of the file to which the first data belongs is the user file or the system file.

Therefore, in the embodiment of the present invention, a file type of a file to which first data belongs is determined, where the first data is stored in a local persistent storage area; and the first data stored in the local persistent storage area, rather than data of all types, is written into a remote shared storage area in a case that the file to which the first data belongs is a user file or a system file. Therefore, access traffic on the remote shared storage area can be reduced, thereby decreasing delay of an I/O write request and improving user experience.

Optionally, as an implement manner of the embodiment, the determining unit 820 may be configured to read image metadata from a memory virtual image, where the memory virtual image is used to store the image metadata, and the image metadata is used to describe data property information of a virtual disk and a type of a file system of the virtual disk. Then, the determining unit 820 may determine the file type of the file to which the first data belongs according to the image metadata, a start sector corresponding to the I/O write request on the virtual disk, and a size of the first data.

Optionally, as an implementation manner of the embodiment, the determining unit 820 may be configured to obtain first file information carried by the I/O write request, where the first file information is determined by the virtual machine, and the first file information may be used to indicate the file to which the first data belongs. The determining unit 820 may determine the file type of the file to which the first data belongs according to the first file information.

Optionally, as an implementation manner of the embodiment, the storage unit 830 may be configured to aggregate the first data stored in the local persistent storage area with second data in the local persistent storage area, to obtain aggregated data, where a file type of a file to which the second data belongs is also the user file or the system file, and write the aggregated data into the remote shared storage area.

Optionally, as an implementation manner of the embodiment, the storage unit 830 may be further configured to, after the first data is written into the remote shared storage area, write the first data into a local cache area if the file type of the file to which the first data belongs is the user file or the system file, and a use frequency of the first data is higher than or equal to a first threshold.

Optionally, as an implementation manner of the embodiment, the host 800 may further include a searching unit 850 and a sending unit 860.

The receiving unit 830 may be further configured to receive an I/O read request from the virtual machine. The searching unit 840 may successively search the local cache area, the local persistent storage area, and the remote shared storage area for third data to be read as requested by the I/O read request until the third data is found. The sending unit 850 may send the found third data to the virtual machine.

Optionally, as an implementation manner of the embodiment, the determining unit 820 may be further configured to determine a file type of a file to which the third data belongs.

The storage unit 830 may be further configured to write the third data into the local cache area when the file type of the file to which the third data belongs is the user file or the system file, and a use frequency of the third data is higher than or equal to a second threshold.

Optionally, as an implementation manner of the embodiment, the determining unit 820 may be configured to read image metadata from a memory virtual image, where the memory virtual image is used to store the image metadata, and the image metadata is used to describe data property information of a virtual disk and a type of a file system of the virtual disk. Then, the determining unit 820 may determine the file type of the file to which the third data belongs according to the image metadata, a start sector corresponding to the I/O read request on the virtual disk, and a size of the third data.

Optionally, as an implementation manner of the embodiment, the determining unit 820 may be configured to obtain second file information carried by the I/O read request, where the second file information is determined by the virtual machine, and the second file information may be used to indicate the file to which the third data belongs. The determining unit 820 may determine the file type of the file to which the third data belongs according to the second file information.

Optionally, as an implementation manner of the embodiment, the host 800 may further include a generating unit 840. The generating unit 840 may be configured to generate the memory virtual image before the determining unit 820 reads the image metadata from the memory virtual image.

For other functions and operations of the host 800, reference may be made to processes of the foregoing method embodiments in FIG. 1 to FIG. 6. To avoid repetition, details are not described herein again.

Figure 9:
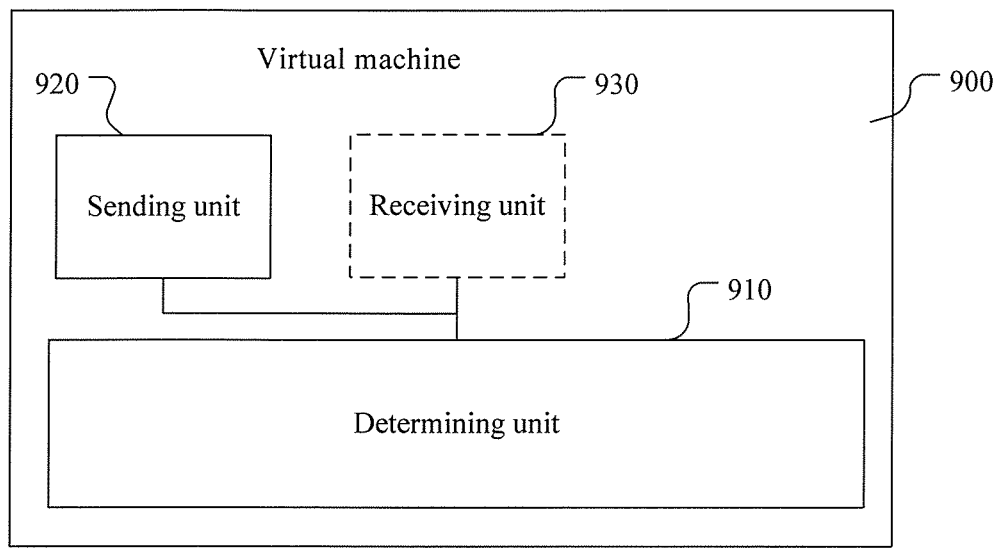
FIG. 9 is a schematic block diagram of a virtual machine according to an embodiment of the present invention.

FIG. 9 is a schematic block diagram of a virtual machine according to an embodiment of the present invention. A virtual machine 900 in FIG. 9 is a virtual machine deployed on a physical host, namely, a virtual machine deployed on the foregoing servers. For example, the virtual machine 900 may be a virtual machine deployed on the servers 110a to 110d shown in FIG. 1. The virtual machine 900 includes a determining unit 910 and a sending unit 920.

The determining unit 910 is configured to determine first file information corresponding to an I/O write request, where the first file information is used to indicate a file to which first data to be written as requested by the I/O write request belongs.

The sending unit 920 is configured to send the I/O write request to a host, where the I/O write request carries the first file information, so that the host determines a file type of the file to which the first data belongs according to the first file information, and writes the first data into a remote shared storage area when the file type of the file to which the first data belongs is a user file or a system file.

Therefore, in the embodiment of the present invention, first file information for indicating a file of first data to be written as requested by an I/O write request is determined, and the I/O write request carrying the first file information is sent to a host, so that the host writes the first data stored in a local persistent storage area into a remote shared storage area in a case that the file to which the first data belongs is a user file or a system file, rather than writing data of all types into the remote shared storage area. Therefore, access traffic on the remote shared storage area can be reduced, thereby decreasing delay of an I/O write request and improving user experience.

Optionally, as an implement manner of the embodiment, the determining unit 910 may further determines second file information corresponding to an I/O read request, where the second file information is used to indicate a file to which third data to be read as requested by the I/O read request belongs. The sending unit 920 may further send the I/O read request to the host, where the I/O read request carries the second file information, so that the host successively searches a local cache area, the local persistent storage area, and the remote shared storage area of a server where the virtual machine 900 is located for the third data to be read as requested by the I/O read request until the third data is found.

Correspondingly, the virtual machine 900 further includes a receiving unit 930, configured to receive the found third data sent by the host.

For other functions and operations of the virtual machine 900, reference may be made to the process of the foregoing method embodiment in FIG. 7. To avoid repetition, details are not described herein again.

Figure 10:
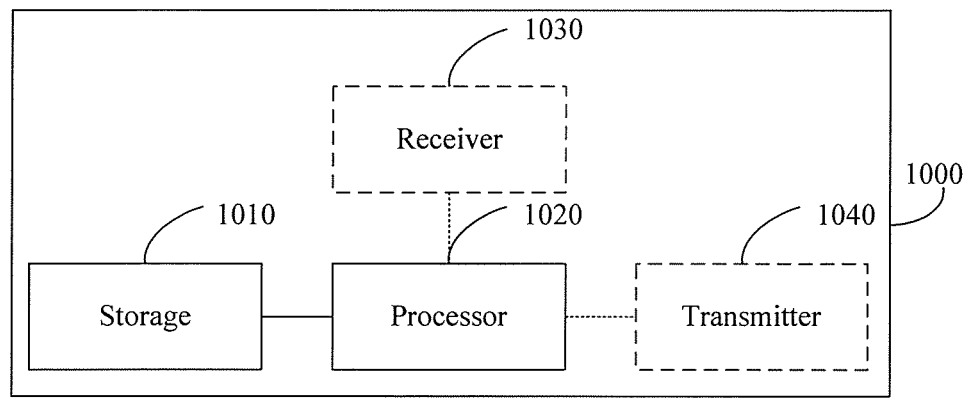
FIG. 10 is a schematic block diagram of a server according to another embodiment of the present invention.

FIG. 10 is a schematic block diagram of a server according to another embodiment of the present invention. A server 1000 in FIG. 10 may also be referred to as a physical host. The server 1000 in FIG. 10 includes a storage 1010 and a processor 1020.

The storage 1010 may include a random access memory, a flash memory, a read-only memory, a programmable read-only memory, a non-volatile memory, a register, or the like. The processor 1020 may be a central processing unit (CPU).

The storage 1010 is configured to store an executable instruction. The processor 1020 may execute the executable instruction stored in the storage 1010, and is configured to receive an input/output I/O write request, write first data to be written as requested by the I/O write request into a local persistent storage area, determine a file type of a file to which the first data belongs, where the file type includes: a temporary file, a user file, and a system file; and write the first data into a remote shared storage area in a case that the file type of the file to which the first data belongs is the user file or the system file.

Therefore, in the embodiment of the present invention, a file type of a file to which first data belongs is determined, where the first data is stored in a local persistent storage area; and the first data stored in the local persistent storage area, rather than data of all types, is written into a remote shared storage area in a case that the file to which the first data belongs is a user file or a system file. Therefore, access traffic on the remote shared storage area can be reduced, thereby decreasing delay of an I/O write request and improving user experience.

Optionally, as an implementation manner of the embodiment, the processor 1020 may be configured to read image metadata from a memory virtual image, where the memory virtual image is used to store the image metadata, and the image metadata is used to describe data property information of a virtual disk and a type of a file system of the virtual disk, and may determine the file type of the file to which the first data belongs according to the image metadata, a start sector corresponding to the I/O write request on the virtual disk, and a size of the first data.

Optionally, as an implementation manner of the embodiment, the processor 1020 may be configured to obtain first file information carried by the I/O write request, where the first file information is determined by a virtual machine, and the first file information may be used to indicate the file to which the first data belongs. The processor 1020 may determine the file type of the file to which the first data belongs according to the first file information.

Optionally, as an implementation manner of the embodiment, the processor 1020 may be configured to aggregate the first data stored in the local persistent storage area with second data in the local persistent storage area, to obtain aggregated data, where a file type of a file to which the second data belongs is also the user file or the system file, and write the aggregated data into the remote shared storage area.

Optionally, as an implementation manner of the embodiment, the processor 1020 may be further configured to, after the first data is written into the remote shared storage area, write the first data into a local cache area if the file to which the first data belongs is the user file or the system file, and a use frequency of the first data is higher than or equal to a preset first threshold.

Optionally, as an implementation manner of the embodiment, the server 1000 may further include a receiver 1030 and a transmitter 1040.

The receiver 1030 may be further configured to receive an I/O read request. The processor 1020 may successively search the local cache area, the local persistent storage area, and the remote shared storage area for third data to be read as requested by the I/O read request until the third data is found. The transmitter 1040 may send the found third data to the virtual machine.

Optionally, as an implementation manner of the embodiment, the processor 1020 may be further configured to determine a file type of a file to which the third data belongs.

The processor 1020 may be further configured to write the third data into the local cache area when the file type of the file to which the third data belongs is the user file or the system file, and a use frequency of the third data is higher than or equal to a second threshold.

Optionally, as an implementation manner of the embodiment, the processor 1020 may be configured to read image metadata from a memory virtual image, where the memory virtual image is used to store the image metadata, and the image metadata is used to describe data property information of a virtual disk and a type of a file system of the virtual disk, and may determine the file type of the file to which the third data belongs according to the image metadata, a start sector corresponding to the I/O read request on the virtual disk, and a size of the third data.

Optionally, as an implementation manner of the embodiment, the processor 1020 may be configured to obtain second file information carried by the I/O read request, where the second file information is determined by the virtual machine, and the second file information may be used to indicate the file to which the third data belongs. The processor 1020 may be configured to determine the file type of the file to which the third data belongs according to the second file information.

Optionally, as an implement manner of the embodiment, the processor 1020 may generate the memory virtual image before reading the image metadata from the memory virtual image.

For other functions and operations of the server 1000, reference may be made to processes of the foregoing method embodiments in FIG. 1 to FIG. 6. To avoid repetition, details are not described herein again.

Figure 11:
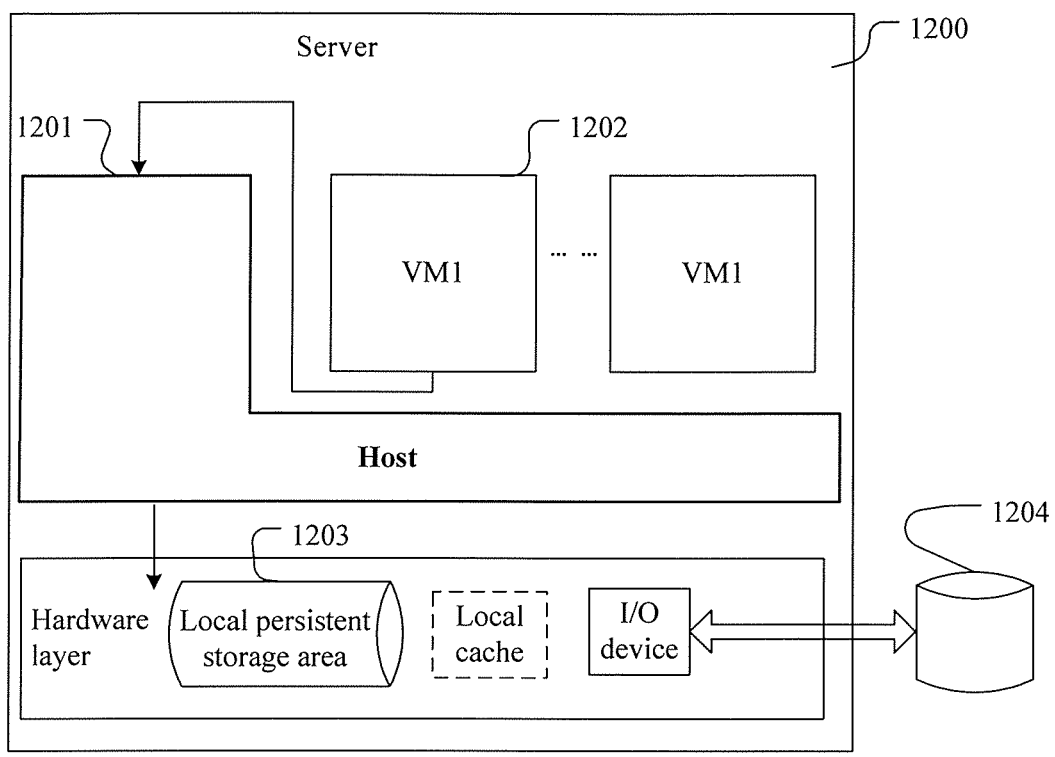
FIG. 11 is a schematic block diagram of a server according to another embodiment of the present invention.

FIG. 11 is a schematic block diagram of a server according to another embodiment of the present invention.

As shown in FIG. 11, an embodiment of the present invention further provides a server. According to FIG. 11, a server 1200 includes:

a hardware layer, a host 1201 running on the hardware layer, and a virtual machine (VM) 1202 running on the Host, where the hardware layer includes an I/O device and a local persistent storage area;

where the host 1201 is configured to receive an I/O write request from the virtual machine 1202, where the I/O write request is sent to the virtual machine 1202 by a client by using the I/O device; write first data to be written as requested by the I/O write request into the local persistent storage area 1203, and determine a file type of a file to which the first data belongs, where the file type includes: a temporary file, a user file, and a system file; and write the first data into a remote shared storage area 1204 connected to the server if the file type of the file to which the first data belongs is the user file or the system file.

In an embodiment, the host 1201 reads image metadata from a memory virtual image; and determines the file type of the file to which the first data belongs according to the image metadata, a start sector corresponding to the I/O write request on a virtual disk, and a size of the first data; where the memory virtual image is used to store the image metadata, and the image metadata is used to describe data property information of the virtual disk of the virtual machine and a type of a file system of the virtual disk of the virtual machine.

In another embodiment, the host 1201 obtains first file information carried by the I/O write request, where the first file information is determined by the virtual machine, and the first file information is used to indicate the file to which the first data belongs; and determines the file type of the file to which the first data belongs according to the first file information. Preferably, the host may write the first data into the remote shared storage area 1204 in a following manner: aggregating the first data with second data in the local persistent storage area 1203, to obtain aggregated data, where a file type of a file to which the second data belongs is also the user file or the system file; and writing the aggregated data into the remote shared storage area 1204.

Preferably, the hardware layer of the server 1200 further includes a local cache area. After writing the first data into the remote shared storage area, the host 1201 further writes the first data into the local cache area if the file type of the file to which the first data belongs is the user file or the system file, and a use frequency of the first data is higher than or equal to a first threshold.

The foregoing first threshold may be determined by the host according to a usage condition of the first data and usage conditions of other data. Therefore, the first threshold is variable. For example, the host discovers after a period of statistics collection that, a use frequency of the first data is more than 40% and use frequencies of other data are all less than 40%, and then the first threshold may be set to be 40%.

It should be noted that, for other functions and operations of the server 1200, reference may be made to processes of the foregoing method embodiments in FIG. 1 to FIG. 6. To avoid repetition, details are not described herein again.

Therefore, in the embodiment of the present invention, a file type of a file to which first data belongs is determined, where the first data is stored in a local persistent storage area; and the first data stored in the local persistent storage area, rather than data of all types, is written into a remote shared storage area in a case that the file to which the first data belongs is a user file or a system file. Therefore, access traffic on the remote shared storage area can be reduced, thereby decreasing delay of an I/O write request and improving user experience.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for processing an input/output request, the method comprising:
    receiving an input/output (I/O) write request from a virtual machine;
    writing first data to be written as requested by the I/O write request into a local persistent storage area;
    reading image metadata from a memory virtual image, wherein the memory virtual image is used to store the image metadata, and the image metadata is used to describe data property information of a virtual disk of the virtual machine and a type of a file system of the virtual disk of the virtual machine;
    determining a file type of a file to which the first data belongs according to the image metadata, a start sector corresponding to the I/O write request of a virtual disk of the virtual machine, and a size of the first data, wherein the file type comprises: a temporary file, a user file, or a system file; and
    writing the first data into a remote shared storage area when the file type of the file to which the first data belongs is the user file or the system file.

2. The method according to claim 1, wherein writing the first data into the remote shared storage area comprises:
    aggregating the first data with second data stored in the local persistent storage area, to obtain aggregated data, wherein a file type of a file to which the second data belongs is the same as the file type of the file to which the first data belongs; and
    writing the aggregated data into the remote shared storage area.

3. The method according to claim 1, wherein after writing the first data into the remote shared storage area, the method further comprises:
    writing the first data into a local cache area when the file type of the file to which the first data belongs is the user file or the system file, and a use frequency of the first data is higher than or equal to a first threshold.

4. A method for processing an input/output request, the method comprising:
    receiving an input/output (I/O) write request from a virtual machine;
    writing first data to be written as requested by the I/O write request into a local persistent storage area;
    determining a file type of a file to which the first data belongs, wherein the file type comprises: a temporary file, a user file, or a system file;
    writing the first data into a remote shared storage area when the file type of the file to which the first data belongs is the user file or the system file;
    receiving an I/O read request from the virtual machine;
    successively searching a local cache area, the local persistent storage area, and the remote shared storage area for third data to be read as requested by the I/O read request until the third data is found; and
    sending the third data that is found to the virtual machine.

5. The method according to claim 4, wherein after sending the third data that is found to the virtual machine, the method further comprises:
    determining a file type of a file to which the third data belongs; and
    writing the third data into the local cache area when the file type of the file to which the third data belongs is the user file or the system file, and a use frequency of the third data is higher than or equal to a second threshold.

6. The method according to claim 5, wherein determining the file type of the file to which the third data belongs comprises:
    reading image metadata from a memory virtual image, wherein the memory virtual image is used to store the image metadata, and the image metadata is used to describe data property information of a virtual disk and a type of a file system of the virtual disk; and
    determining the file type of the file to which the third data belongs according to the image metadata, a start sector corresponding to the I/O read request on the virtual disk and a size of the third data.

7. The method according to claim 5, wherein determining the file type of the file to which the third data belongs comprises:
    obtaining second file information carried by the I/O read request, wherein the second file information is determined by the virtual machine, and the second file information is used to indicate the file to which the third data belongs; and
    determining the file type of the file to which the third data belongs according to the second file information.

8. A method for processing an input/output request, the method comprising:
    determining first file information corresponding to an input/output (I/O) write request, wherein the first file information is used to indicate a file to which first data to be written as requested by the I/O write request belongs;
    sending the I/O write request to a host, wherein the first file information is carried in the I/O write request, so that the host determines a file type of the file to which the first data belongs according to the first file information after writing the first data to be written as requested by the I/O write request into a local persistent storage area, and writes the first data into a remote shared storage area when it is determined that the file type of the file to which the first data belongs is a user file or a system file;
    determining second file information corresponding to an I/O read request, wherein the second file information is used to indicate a file to which third data to be read as requested by the I/O read request belongs;
    sending the I/O read request to the host, wherein the second file information is carried in the I/O read request, so that the host searches a local cache area, the local persistent storage area, and the remote shared storage area for the third data to be read as requested by the I/O read request until the third data is found; and
    receiving the third data from the host.

9. A computer system, comprising:
    a processor; and
    a memory coupled to the processor for executing a plurality of modules and a plurality of instructions present in the memory, the plurality of modules comprising:
        a virtual machine, configured to:
            determine first file information corresponding to an input/output (I/O) write request, wherein the first file information is used to indicate a file to which first data to be written as requested by the I/O write request belongs; and
            send the I/O write request to a host, and a host, configured to:
receive the input/output (I/O) write request from the virtual machine; write first data to be written as requested by the I/O write request into a local persistent storage area;
read image metadata from a memory virtual image, wherein the memory virtual image is used to store the image metadata, and the image metadata is used to describe data property information of a virtual disk and a type of a file system of the virtual disk;
determine a file type of a file to which the first data belongs according to the image metadata, a start sector corresponding to the I/O write request of a virtual disk of the virtual machine, and a size of the first data, wherein the file type comprises: a temporary file, a user file, or a system file; and
write the first data into a remote shared storage area when the file type of the file to which the first data belongs is the user file or the system file.

10. The computer system according to claim 9, wherein in writing the first data into the remote shared storage area, the host is further configured to:
aggregate the first data with second data in the local persistent storage area, to obtain aggregated data, wherein a file type of a file to which the second data belongs is the same as the file type of the file to which the first data belongs; and
write the aggregated data into the remote shared storage area.

11. The computer system according to claim 9, wherein the host is further configured to, after the first data is written into the remote shared storage area, write the first data into a local cache area when the file type of the file to which the first data belongs is the user file or the system file, and a use frequency of the first data is higher than or equal to a first threshold.

12. A computer system, comprising:
a processor; and
a memory coupled to the processor for executing a plurality of modules and a plurality of instructions present in the memory, the plurality of modules comprising a virtual machine and a host;
wherein the virtual machine is configured to:
determine first file information corresponding to an input/output (I/O) write request, wherein the first file information is used to indicate a file to which first data to be written as requested by the I/O write request belongs; and
send the I/O write request to the host, wherein the I/O write request carries the first file information, and
wherein the host is configured to:
receive the I/O write request from the virtual machine; write the first data to be written as requested by the I/O write request into a local persistent storage area;
determine a file type of the file to which the first data belongs according to the first file information carried by the I/O write request, wherein the file type comprises: a temporary file, a user file, or a system file; and
write the first data into a remote shared storage area when the file type of the file to which the first data belongs is the user file or the system file;
wherein the virtual machine is further configured to:
determine second file information corresponding to an I/O read request, wherein the second file information is used to indicate a file to which third data to be read as requested by the I/O read request belongs, and
send the I/O read request to the host, wherein the I/O read request carries the second file information; and
wherein the host is further configured to:
receive the I/O read request from the virtual machine, search a local cache area, the local persistent storage area, and the remote shared storage area for third data to be read as requested by the I/O read request until the third data is found, and
send the third data that is found to the virtual machine.

13. The computer system according to claim 12, wherein the host is further configured to:
determine a file type of a file to which the third data belongs after the third data that is found is sent to the virtual machine; and
write the third data into the local cache area when the file type of the file to which the third data belongs is the user file or the system file, and a use frequency of the third data is higher than or equal to a second threshold.

14. The computer system according to claim 13, wherein in determining the file type of the file to which the third data belongs, the host is further configured to:
read image metadata from a memory virtual image, wherein the memory virtual image is used to store the image metadata, and the image metadata is used to describe data property information of a virtual disk and a type of a file system of the virtual disk; and
determine the file type of the file to which the third data belongs according to the image metadata, a start sector corresponding to the I/O read request on the virtual disk, and a size of the third data.

15. The computer system according to claim 13, wherein in determining the file type of the file to which the third data belongs, the host is further configured to:
obtain the second file information carried by the I/O read request, wherein the second file information is determined by the virtual machine, and the second file information is used to indicate the file to which the third data belongs; and
determine the file type of the file to which the third data belongs according to the second file information.

* * * * *